(12) United States Patent
Lim

(10) Patent No.: US 7,750,819 B2
(45) Date of Patent: Jul. 6, 2010

(54) REAL-TIME DETECTION OF WAFER SHIFT/SLIDE IN A CHAMBER

(75) Inventor: Khoon Peng Lim, Singapore (SG)

(73) Assignee: TECH Semiconductor Singapore Pte Ltd, Singapore (SG)

( * ) Notice: Subject to any disclaimer, the term of this patent is extended or adjusted under 35 U.S.C. 154(b) by 277 days.

(21) Appl. No.: 12/080,893

(22) Filed: Apr. 7, 2008

(65) Prior Publication Data

US 2009/0249880 A1 Oct. 8, 2009

(51) Int. Cl.
*G08B 21/00* (2006.01)
(52) U.S. Cl. .................................................. 340/686.1
(58) Field of Classification Search .............. 340/686.1, 340/524, 582, 683, 691.6; 73/570, 658; 33/645
See application file for complete search history.

(56) References Cited

U.S. PATENT DOCUMENTS

| | | | | |
|---|---|---|---|---|
| 4,513,430 A * | 4/1985 | Vora et al. | | 377/39 |
| 5,483,138 A | 1/1996 | Shmookler et al. | | |
| 5,563,798 A | 10/1996 | Berken et al. | | |
| 5,740,062 A | 4/1998 | Berken et al. | | |
| 5,851,102 A * | 12/1998 | Okawa et al. | | 414/783 |
| 5,980,194 A * | 11/1999 | Freerks et al. | | 414/754 |
| 5,982,492 A | 11/1999 | Oppenheimer et al. | | |
| 6,052,913 A * | 4/2000 | Kaneko et al. | | 33/645 |
| 6,298,282 B1 | 10/2001 | Guldi et al. | | |
| 6,471,464 B1 | 10/2002 | Fay et al. | | |
| 6,576,483 B1 | 6/2003 | Chou et al. | | |
| 6,601,313 B2 * | 8/2003 | Shin et al. | | 33/645 |
| 6,778,266 B2 | 8/2004 | Hu et al. | | |
| 6,900,877 B2 | 5/2005 | Raaijmakers | | |
| 6,934,661 B2 | 8/2005 | Yuen et al. | | |
| 6,938,505 B2 | 9/2005 | Chen et al. | | |
| 7,029,930 B2 | 4/2006 | Tomer et al. | | |
| 2004/0151574 A1 | 8/2004 | Lu | | |
| 2005/0012938 A1 * | 1/2005 | Chen et al. | | 356/614 |
| 2005/0091863 A1 * | 5/2005 | Chuang et al. | | 33/645 |
| 2006/0209307 A1 | 9/2006 | Kim | | |
| 2007/0140826 A1 | 6/2007 | Ho et al. | | |

* cited by examiner

*Primary Examiner*—Phung Nguyen
(74) *Attorney, Agent, or Firm*—Saile Ackerman LLC; Stephen B. Ackerman

(57) ABSTRACT

Methods and systems for detecting wafer shift/slide in a semiconductor process chamber have been disclosed. The vibration amplitude is measured in terms of acceleration because an increase in vibrational acceleration correlates with an increase of displacement of a wafer. The vibration of a chamber is measured. External vibratory forces acting on the chamber may be transmitted to the wafer inside the chamber. The methods/systems determine if there is a net resultant force that may cause an unconstrained wafer to move from its original position in a chamber by measuring the relative chamber vibrations in three orthogonal directions. A tri-axial or three uni-axial accelerometers are mounted on a preferably exterior wall of the chamber to measure its vibration amplitude. The signal obtained as a function of time is then compared against a predetermined alarm amplitude to provide notification for corrective action.

40 Claims, 6 Drawing Sheets

REAL-TIME DETECTION OF WAFER SHIFT/SLIDE IN A CHAMBER

BACKGROUND OF THE INVENTION (1) Field of the Invention

This invention relates to a system and method for detecting wafer shift/slide in a chamber. In particular, it determines whether there is a net resultant force that may cause an unconstrained wafer to move from its original position in a chamber by measuring the relative chamber vibrations in three orthogonal directions.

(2) Description of the Prior Art

In the manufacture of semiconductor devices, silicon wafers are processed in multiple chambers. These wafers are generally supported in the chambers by wafer support units which have little or no contact with the patterned surface of the wafers to reduce contact-induced defects. However, such wafer support units have a weaker grip on the wafers. As a result, wafers can easily be displaced from their original positions when the chambers experience perturbations or vibrations created by any moving parts, such as slit valve, cryo pump, exhaust pump, process motor and robot arm. Other external sources, including human-induced vibration such as equipment maintenance work and footfall activities, can also cause the wafer to shift.

It is important to detect wafer shift/slide within a chamber as soon as it occurs because a wafer that is not normally positioned could cause the following problems:

The wafer will not be correctly clamped by the robot arm out from the chamber.

The wafer will be bumped into fragments by the robot arm inserting into the chamber. As a result, the equipment will have to be stopped to clear the fragments. This will affect the normal operation in the production and shorten the lifetime of the elements of process tools.

The wafer will not have the full complement of the integrated circuits produced on it.

Some wafer fabrication equipment, like sputtering machine, consists of an electrode which must be completely covered by the wafer during processing. However, a misaligned wafer will not be able to do so. When the wafer surface is bombarded with plasma, some of the plasma unintentionally bombards the electrode which creates airborne contaminant particles that fall on the semiconductor dies and lowers production yield of the semiconductor circuits fabricated on the wafers.

Therefore, a real-time system and method for detecting wafer shift/slide in a chamber will be highly advantageous.

Currently, there are a few known systems and methods for ensuring that wafers are in their nominal or intended positions. They include those disclosed in U.S. Pat. No. 5,483,138, U.S. Pat. No. 5,563,798, U.S. Pat. No. 5,740,062, U.S. Pat. No. 5,982,492, U.S. Pat. No. 6,298,282B1, U.S. Pat. No. 6,471,464B1, U.S. Pat. No. 6,576,483B1, U.S. Pat. No. 6,601,313B2, U.S. Pat. No. 6,778,266B2, U.S. Pat. No. 6,900,877B2, U.S. Pat. No. 6,934,661B2, U.S. Pat. No. 6,938,505B2, U.S. Pat. No. 7,029,930B2, U.S. Patent Publication No. 2004/0151574A1, U.S. Patent Publication No. 2005/0012938A1, U.S. Patent Publication No. 2006/0209307A1 and U.S. Patent Publication No. 2007/0140826A1.

U.S. Pat. No. 5,483,138 to Shmookler et al., U.S. Pat. No. 5,563,798 to Berken et al., U.S. Pat. No. 5,740,062 to Berken et al., U.S. Pat. No. 5,982,492 to Oppenheimer et al., U.S. Pat. No. 6,601,313B2 to Shin and Kim, U.S. Pat. No. 6,778,266B2 to Hu et al., U.S. Pat. No. 6,934,661B2 to Yuen et al., U.S. Patent Publication No. 2004/0151574A1 to Lu, U.S. Patent Publication No. 2005/0012938A1 to Chen and Wei and U.S. Patent Publication No. 2007/0140826A1 to Ho and Shieh use optical sensors to detect the position of wafers. U.S. Pat. No. 6,900,877B2 to Raaijmakers determines wafer drift by using one or more cameras to capture the image of wafers, while U.S. Pat. No. 6,938,505B2 to Chen et al. detects misaligned or broken wafers based on uneven load distribution on supporting pins.

In U.S. Pat. No. 6,298,282B1 to Guldi et al., a vibration sensor placed on at least one of the robotic arm or under the cassette control of the robotic arms detects excessive vibration to wafers during their transport in and out from a cassette.

In U.S. Pat. No. 7,029,930B2 to Tomer et al., an electronic recording system attached to a test wafer records the motion of wafers, and fine perturbations and vibrations in their motion during their progress through and between semiconductor process and inspection machines in the course of the actual manufacturing process or in test cycles of these machines.

U.S. Patent Publication No. 2006/0209307A1 to Sun-bong Kim discloses how defects are prevented from occurring during an exposure process by detecting vibration of and measuring the relative position of components of the exposure apparatus. The exposure apparatus includes an external frame on which a reference mirror is disposed, a projection lens, a first mirror fixed relative to the projection lens, a wafer stage, a second mirror fixed relative to the wafer stage, and an interferometer system that detects vibration of the projection lens using the reference mirror and the first mirror and detects the position of the wafer stage relative to the projection lens using the first and second mirrors. A second interferometer system may be provided to detect vibration of the first interferometer system.

U.S. Pat. No. 6,471,464B1 to Fay et al. discloses a device for orienting and/or centering a wafer. The device employs a CCD camera and backlighting source which enhances the CCD camera's ability to detect wafer position. The backlighting source may be positioned along the side of the wafer opposite the CCD camera, or may be positioned adjacent to the CCD camera. When positioned adjacent to the CCD camera, one or more shields are employed to prevent direct or reflected light from impacting the top surface of the wafer being detected by the CCD camera. Accordingly, the only light detected by the CCD camera is light which passes the wafer and reflects from a surface there beyond, back to the CCD camera, resulting in effective backlighting of the wafer. The image of the wafer may be further sharpened by roughening the surface from which light reflects back to CCD camera.

U.S. Pat. No. 6,576,483B1 to Chou et al. discloses a backside cannelure of an electrode to provide for detecting semiconductor wafer shift after the wafer has been positioned over the cannelure of the electrode. The wafer has a backside and a proper position over the cannelure. The cannelure exposes the backside of the wafer to a gas piped in through one or more holes of the electrode. The cannelure has a size such that deviation of the wafer from its proper position by more than a threshold partially exposes the cannelure, such that the gas leaks from the partially exposed cannelure. A gas flow detector may detect the gas leaking from the cannelure, and provide corresponding detection of the wafer deviating from its proper position.

SUMMARY OF THE INVENTION

A principal object of the present invention is to provide real-time detection of wafer shift/slide in a semiconductor process chamber.

Another principal object of the present invention is to provide a timely signal of wafer shift/slide in a semiconductor process chamber to permit corrective actions.

A further object of the present invention is to achieve a non-intrusive system that is not interfering with a wafer process.

Another object of the present invention is to achieve an easy to be implemented system, which can be implemented on any chamber where real-time detection of wafer shift/slide is desired.

In accordance with the objects of this invention a method to detect real-time wafer shift/slide in a semiconductor process chamber has been achieved. The method comprises steps of (1) providing a semiconductor process chamber, an accelerometer mounted on a wall of the chamber, a signal conditioner, an anti-aliasing filter (low pass filter), an analog-to-digital converter (A/D), and a digital signal processor (DSP), (2) measuring the acceleration of the chamber in three directions, correlating to vibration amplitudes, (3) comparing vibration measured as function of time against a pre-determined alarm amplitude, and (4) initiating notification for corrective action if vibration measured exceeds alarm threshold.

In accordance with the objects of this invention a system to detect real-time wafer shift/slide in a semiconductor process chamber has been achieved. The system invented comprises, first, means to measure acceleration in three orthogonal directions, wherein said means to measure acceleration is mounted on a wall of said process chamber, a signal conditioner, amplifying the signals of the means to measure acceleration, an anti-aliasing filter (low pass filter), attenuating high-frequency signals, an analog-to-digital A/D converter, wherein its output is the input of a DSP, and a dynamic spectrum analyzer (DSA) receiving measurement signals from said means to measure acceleration. The DSA comprises a DSP performing all required calculations, receiving measurement signals from said A/D converter, a program and data memory, being connected to said DSP, a digital-to-analog (D/A) converter, being connected to said DSP, a watchdog device, being connected to said DSP, monitoring an alarm function of the system, a relay being triggered by said DSP, and a communication port (RS232) being connected to said DSP. Furthermore the system invented comprises a process controller, being connected to said DSP, an alarm device, being initiated by said relay, a visual display unit, and an unit providing keyboard inputs to said DSP.

BRIEF DESCRIPTION OF THE DRAWINGS

In the accompanying drawings forming a material part of this description, there is shown.

DESCRIPTION OF THE PREFERRED EMBODIMENTS

The preferred embodiments disclose methods and systems to provide real-time detection of wafer shift/slide in a chamber and to provide a timely signal of wafer shift/slide in a chamber to permit corrective actions.

These objects are achieved by measuring the vibration of the chamber. External vibratory forces acting on the chamber may be transmitted to the wafer inside the chamber. In the present invention, an accelerometer is mounted on a wall of the chamber to measure its vibration amplitude. The signal obtained as a function of time is then compared against a pre-determined alarm amplitude to provide notification for corrective action.

Figure 1:
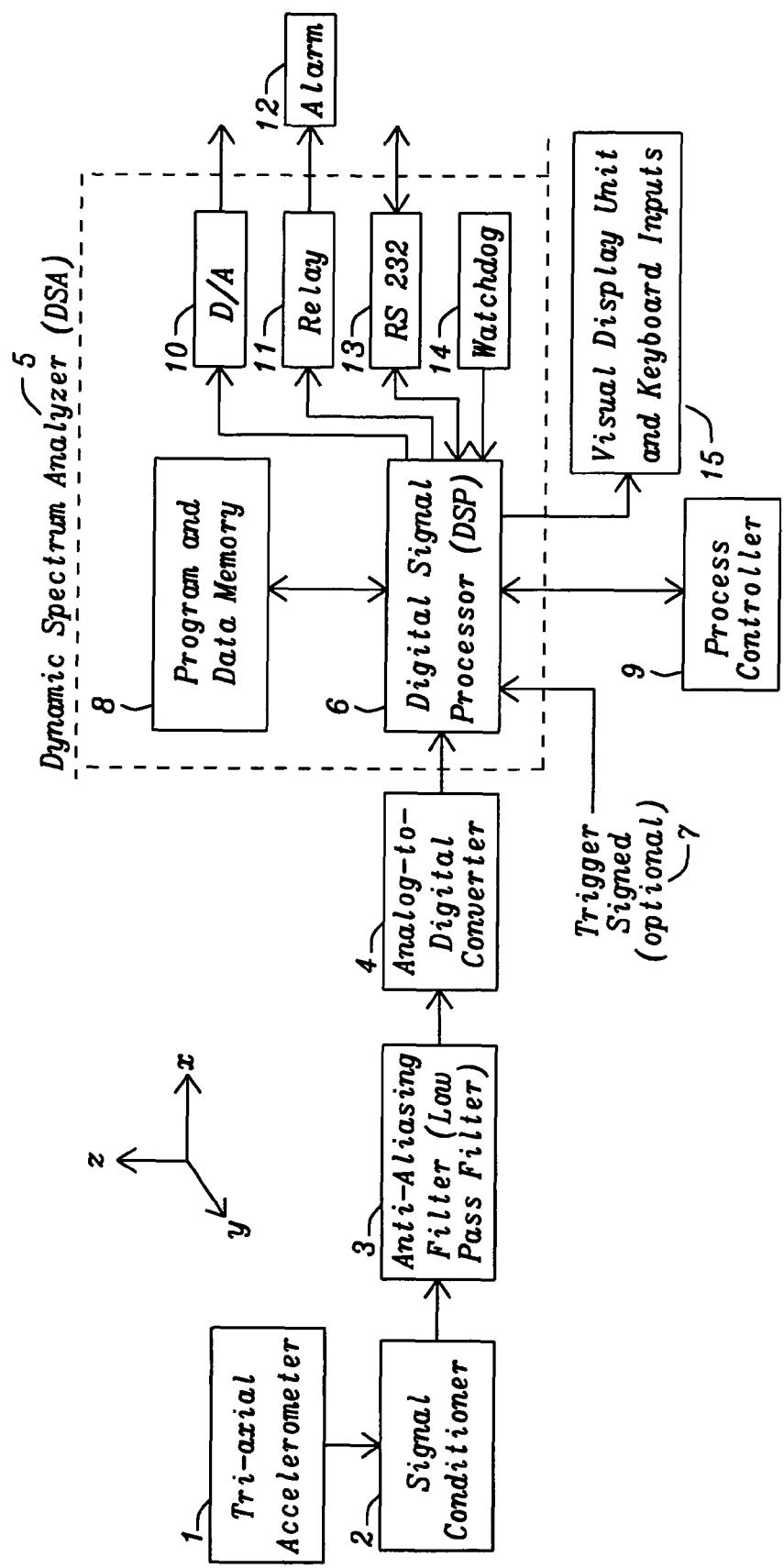
FIG. 1 shows schematically a preferred embodiment of an apparatus of the present invention.
Figure 2A:
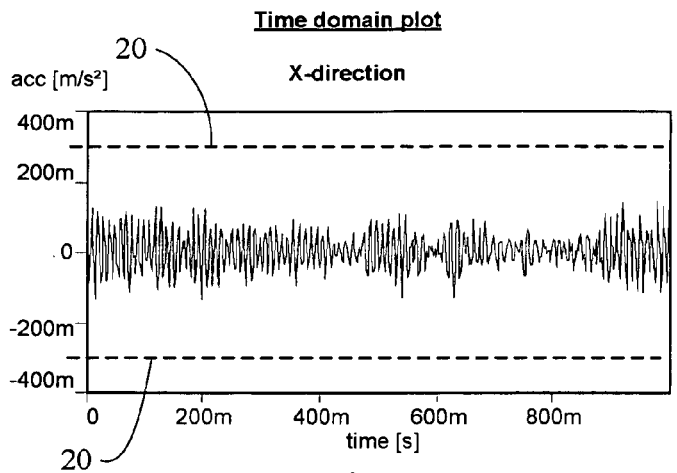
FIGS. 2a-f shows examples of typical time domain plots obtained for all three orthogonal directions and their equivalent orbit plots.
Figure 2D:
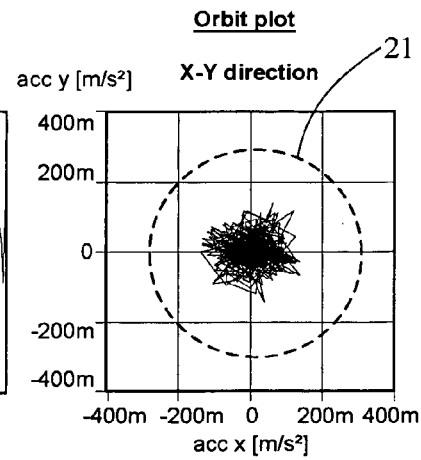
Figure 2B:
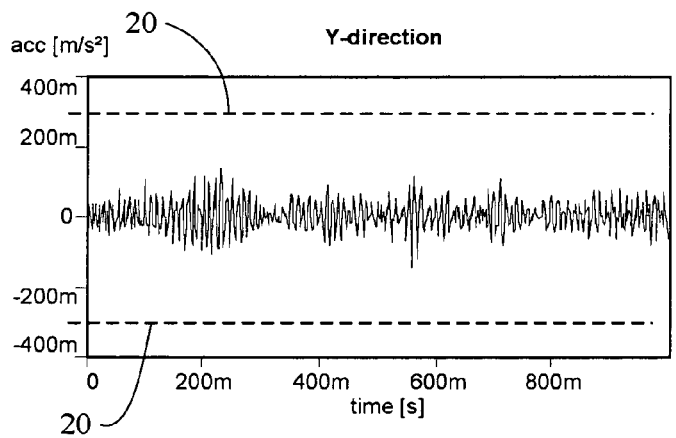
Figure 2E:
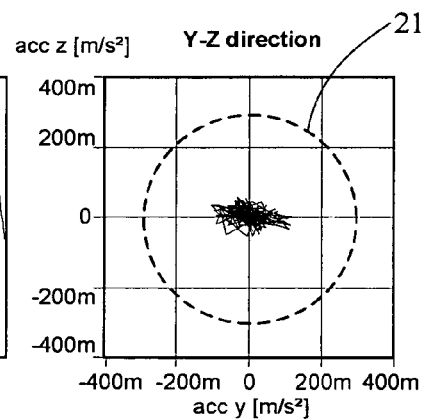
Figure 2C:
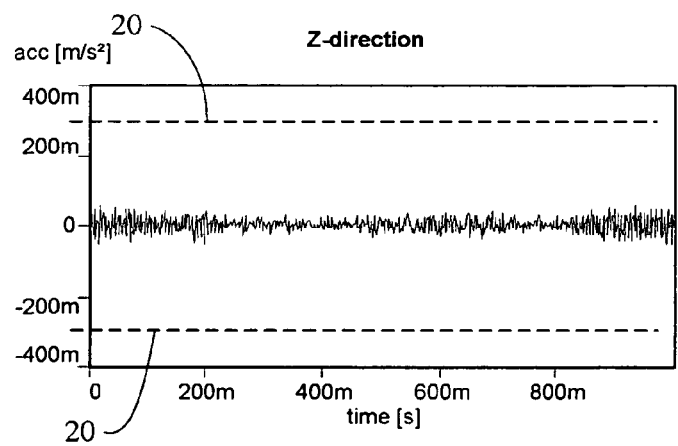
Figure 2F:
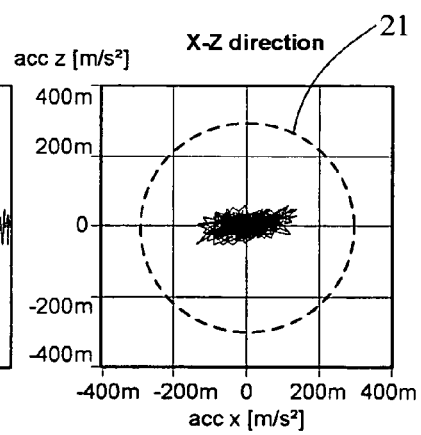

FIG. 1 shows schematically a preferred embodiment of an apparatus of the present invention. A preferred device for vibration sensing is a tri-axial accelerometer 1 because it can be installed in small space without significant mass loading effect. However, three uni-axial accelerometers, or a dual-axial accelerometer combined with a uni-axial accelerometer, or other related devices such as laser vibrometers or strain gauge devices could also have been used without departing from the spirit of the invention.

To avoid disturbance to wafer fabrication processes, the tri-axial accelerometer 1 is mounted preferably on the exterior wall of the chamber. Alternatively the accelerometer could be mounted, if desired, on an interior wall of the chamber as well. It measures the vibration amplitude in three orthogonal directions (x, y and z) as a function of time. As mentioned above other means to measure acceleration in three direction could be used as well. Although vibration amplitude can be measured in terms of displacement, velocity or acceleration, acceleration was selected because this invention is based on Newton's law of inertia which relates to the tendency of a body to resist acceleration. In other words, the wafer will remain in its state of rest within the chamber unless acted upon by a resultant force whereby:

$$F=ma$$

F is the resultant force acting on the wafer, m is the mass of the wafer and a is the acceleration. Thus, an increase in vibrational acceleration correlates with an increase in displacement of the wafer from its original position in the chamber. In this case, the resultant force is a single force acting on the wafer whose effect is equivalent to the combined effects of two or more separate forces. If the resultant force is small then there will be no wafer movement due to the frictional force with the contact surface or area.

Vibration measurements can be carried out continuously or it can be prompted to start when the chamber is in use via an external trigger signal 7. The signal from the accelerometer 1 is amplified by a signal conditioner 2, which may be a stand alone unit or built into a dynamic spectrum analyzer (DSA) 5. The analog signals are passed through an anti-aliasing filter, a low pass filter 3 to an analog-to-digital (A/D) converter 4 to produce a digital signal which is then processed by a digital signal processor (DSP) 6. The DSP 6 is controlled by a computer program, and performs all required calculations, including additional filtering, computation of time and frequency measurements, and management of multiple channel signal measurements. The DSP 6 computes the time data from two channels and plots the relative motion (force). Furthermore, the DSP 6 computes the x-y, x-z and y-z plane relative motion (force) indicating the orbit.

The data collected is stored in a data memory 8 and the assembled output of DSP 6 is sent to a visual display unit 15. RS232 serves as a serial communication port 13 for interfacing to other personal computers or modems for networking, etc, while a watchdog 14 serves to monitor whether the alarm 12, activated by relay 11, has exceeded the preset limit.

The watchdog 14 can also be used to reset the system in the event of transmission error or other fault conditions. The process controller 9 controls the operation of the DSA 5. In a preferred embodiment the watchdog 14 is a comparator which compares the measured data to a predefined or guardband limit. If the measured data exceeds the predefined or guardband limit, the watchdog 14 will trigger the DSP 6 to sound an alarm.

Data is displayed as an orbit plot as it represents best the motion of the chamber. An orbit plot shows one time trace on the x-axis and a second time trace on the y-axis. FIG. 2 *a-f* shows examples of typical time domain plots obtained for all three orthogonal directions and their equivalent orbit plots. The alarm limit of the time domain plot is indicated by two horizontal straight lines 20 while the alarm limit of the orbit plot is defined by the equation of a circle 21, i.e.

$$x^2+y^2=r^2$$

where x and y are the vibration amplitude and r is the alarm limit.

The DSP 6 is programmed to trigger a visible/audible alarm 12 by activating a relay 11 when the vibration amplitude in any direction exceeds a preset amplitude limit. The vibration amplitude may be permitted to exceed the alarm limit several times before the alarm is triggered. This alarm limit is set after considering the mass of the wafer in the chamber. A second pre-alarm limit, e.g. at 70% of the alarm limit, could also be added. The alarm can be stopped manually after corrective action is taken or a process controller can be provided to stop the alarm automatically when the vibration amplitude falls below the alarm limit.

The D/A converter 10 serves to convert the output digital signal from the DSP to an analog signal. The analog signal is usually fed into a low pass filter to remove the high frequency noise before feeding into an analog device such as a controller.

It should be noted that alternatively a personal computer with appropriate hardware and software can also be configured to perform the task of the DSA 5: Furthermore a personal computer with appropriate software can perform the task of the process controller 9.

Several case studies have been carried out to demonstrate the feasibility of the present invention:

Case Study 1: Sputter Mainframe Wafer Transfer Chambers

Figure 3A:
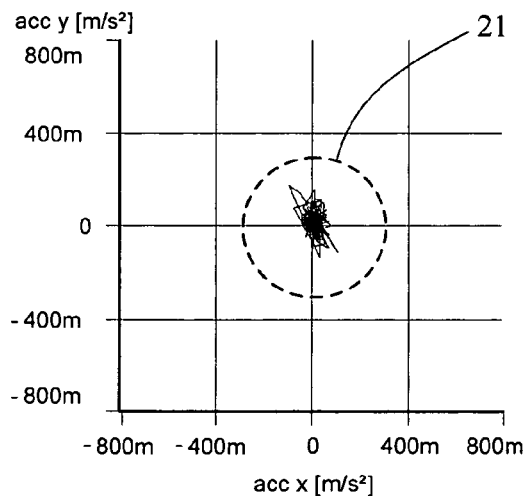
FIGS. 3a-d show orbit plots generated by sputter mainframe wafer transfer chambers.
Figure 3B:
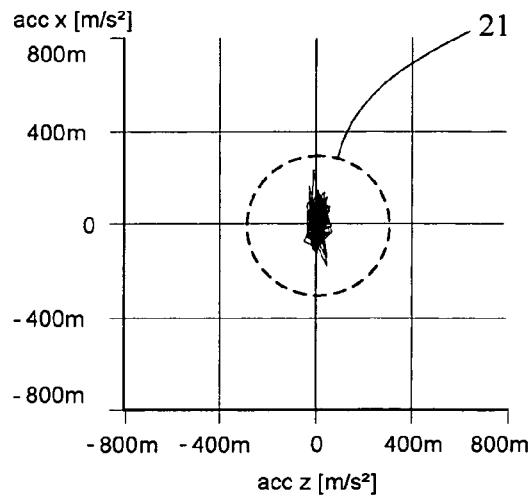
Figure 3C:
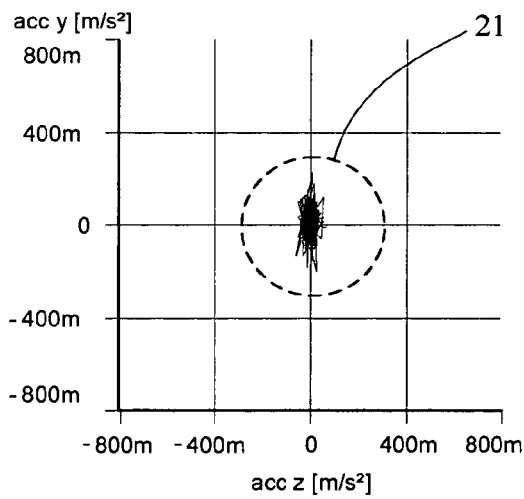
Figure 3D:
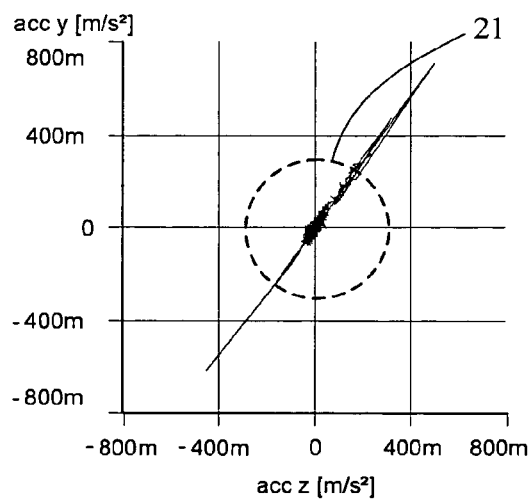

FIGS. 3*a-d* show orbit plots generated by sputter mainframe wafer transfer chambers. Under normal behavior, the orbit plot shows a small spot in the centre which implies that there is minimal chamber movement (FIGS. 3*a-c*). This is in contrast with the orbit plot obtained when a disturbance is experienced (FIG. 3*d*). A sporadic motion is observed in the Z-Y direction which causes the wafer to slide in that plane. The source of disturbance can be traced by transforming the time domain signal to its frequency domain equivalent using a Fast Fourier Transform (FFT) algorithm.

Case Study 2: Sputter Process Chambers

Figure 4A:
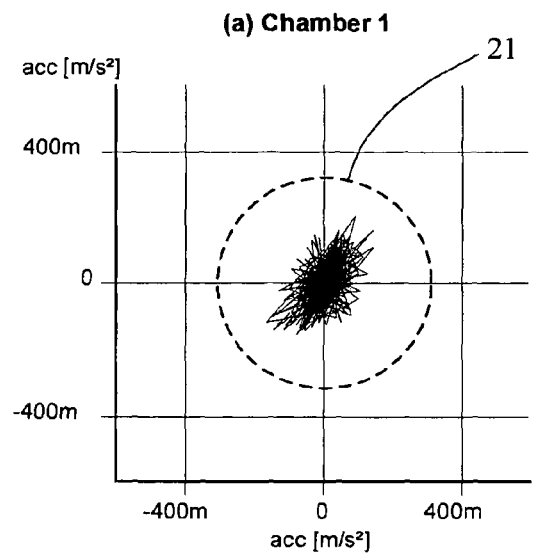
FIGS. 4a-d illustrates orbit plots generated by sputter process chambers.
Figure 4B:
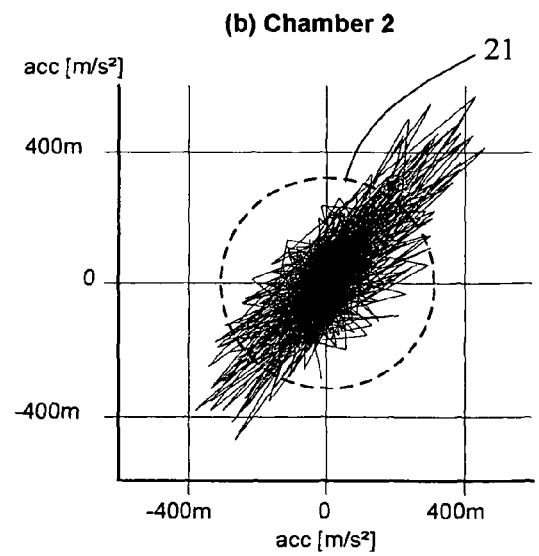
Figure 4C:
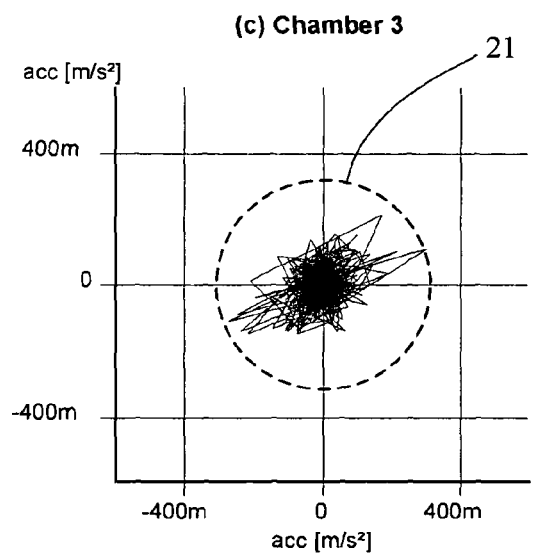
Figure 4D:
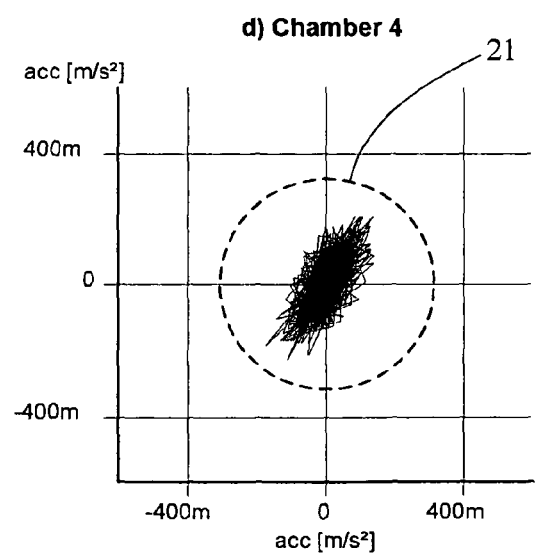

FIGS. 4*a-d* illustrates orbit plots generated by sputter process chambers. Four similar process chambers are compared. Results show that the second chamber experiences a higher resultant force compared to the other three chambers (FIGS. 4*a, c, d*). Therefore, wafers processed in this chamber have a higher chance of shifting/sliding out of their original positions. The vibration source was later traced to a deteriorating turbo pump.

Case Study 3: Copper/Tantalum Sputtering Chamber

Figure 5A:
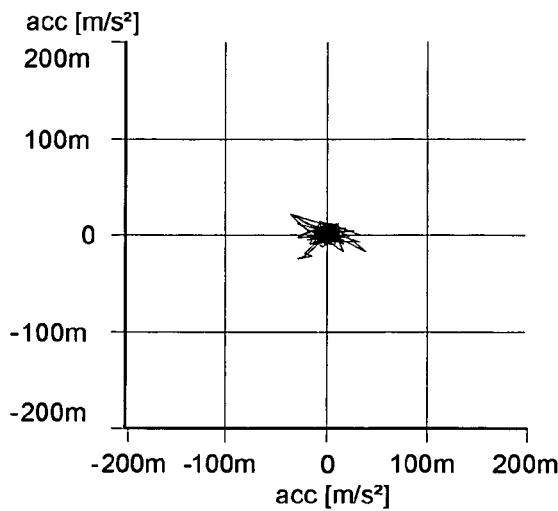
FIGS. 5a-c illustrates orbit plots generated by a copper/tantalum sputtering chamber.
Figure 5B:
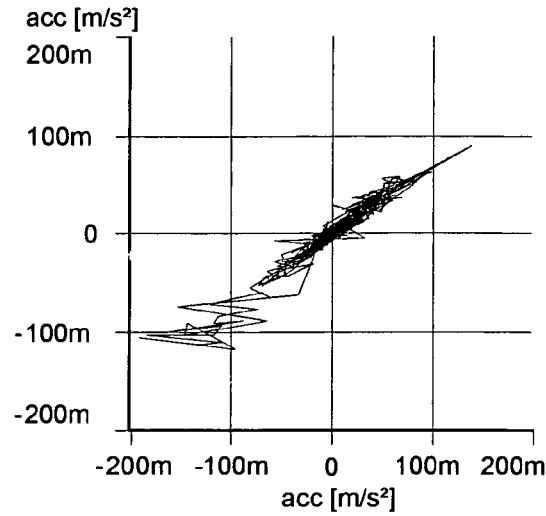
Figure 5C:
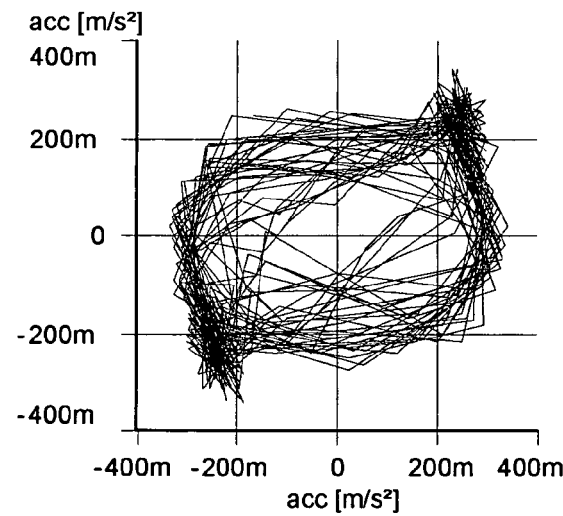

FIGS. 5*a-c* illustrates orbit plots generated by a copper/tantalum sputtering chamber. Similarly, the small spot in FIG. 5*a* indicates that the process is operating normally, while FIG. 5*b* indicates that the chamber is experiencing a disturbance in the X-Y plane. Intermittent wafer shift/slide was captured on video but the root cause was unknown. However, analysis performed using vibration signals can be used to locate the source of disturbance and the direction of the shift/slide. Correlating the chamber vibration results with a slit valve vibration results suggest that the resultant force in the horizontal plane is due to the closing of slit valve. If the vibration becomes excessive, a hysteresis plot (FIG. 5*c*) may even be observed. This is likely due to excessive force that exceeds the sensors limits causing sensor to saturate.

The time domain plots of FIGS. 3-5 show in horizontal axis time in seconds and in vertical axis acceleration in m/s$^2$.

The orbit plots of FIGS. 3-5 show in horizontal axis and in vertical axis acceleration in m/s$^2$.

Figure 6:
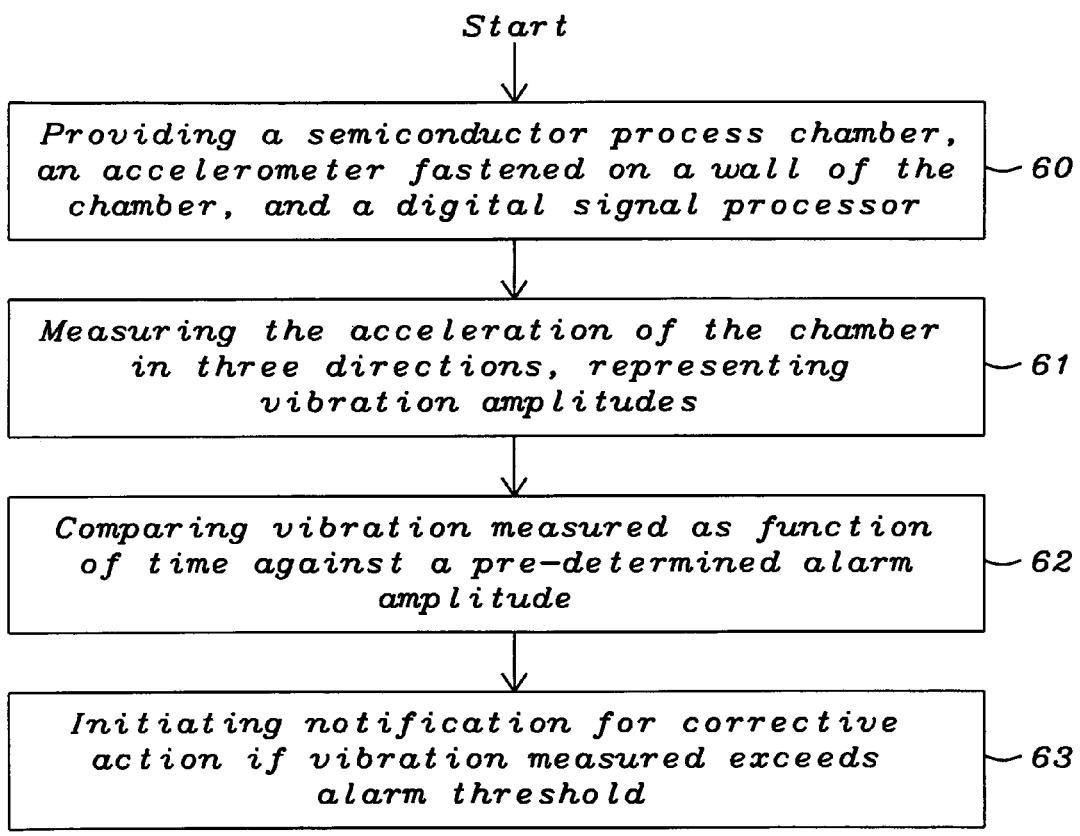
FIG. 6 shows a flowchart of the basic steps of a method invented to detect real-time wafer shift/slide in a semiconductor process chamber, permitting alarm and corrective action in case a predetermined vibration threshold is exceeded.

FIG. 6 shows a flowchart of the basic steps of a method invented to detect real-time wafer shift/slide in a semiconductor process chamber, permitting alarm and corrective action in case a predetermined vibration threshold is exceeded. Step 60 illustrates the provision of a semiconductor process chamber, an accelerometer, fastened on a wall of the chamber, and a DSP. In step 61 the acceleration of the chamber is measured in three directions, wherein the acceleration measured represents the vibration amplitudes of the chamber. Step 62 describes a comparison of the vibration measured as a function of time against a pre-determined alarm amplitude and step 63 describes initiating notification for corrective action if vibration measured exceeds an alarm threshold.

In summary, key properties of the present invention are that it is easy to be implemented with low cost. The system invented can be implemented on any chambers where real-time detection of wafer shift/slide is desired. Furthermore the system is non-intrusive. The system is installed preferably externally and thus, will not interfere with a wafer process. Finally the system invented has multiple functions. The system not only detects potential wafer shift/slide in a chamber, it can also be used to determine the source of disturbance.

While the invention has been particularly shown and described with reference to the preferred embodiments thereof, it will be understood by those skilled in the art that various changes in form and details may be made without departing from the spirit and scope of the invention.

What is claimed is:

1. A method to detect real-time wafer shift/slide in a semiconductor process chamber comprising steps of
    (1) providing a semiconductor process chamber, an accelerometer mounted on a wall of the chamber, a signal conditioner, an analog-to-digital converter, and a digital signal processor;
    (2) measuring the acceleration of the chamber in three orthogonal directions, correlating to vibration amplitudes;
    (3) comparing vibration measured as function of time against a pre-determined alarm amplitude; and
    (4) initiating notification for corrective action if vibration measured exceeds alarm threshold.

2. The method of claim 1 wherein additionally an anti-aliasing filter is provided.

3. The method of claim 1 wherein said accelerometer is mounted on an exterior wall of the chamber.

4. The method of claim 1 wherein said accelerometer is mounted on an interior wall of the chamber.

5. The method of claim 1 wherein said accelerometer is a tri-axial accelerometer.

6. The method of claim 1 wherein three uni-axial accelerometers are used to measure the acceleration of the chamber in three orthogonal directions.

7. The method of claim 1 wherein a combination of a dual-axial accelerometer with a uni-axial accelerometer is used to measure the acceleration of the chamber in three orthogonal directions.

8. The method of claim 1 wherein strain gauge devices are used to measure the acceleration of the chamber in three orthogonal directions.

9. The method of claim 1 wherein laser vibrometers are used to measure the acceleration of the chamber in three orthogonal directions.

10. The method of claim 1 wherein said vibration measurements are performed continuously.

11. The method of claim 1 wherein said vibration measurements are prompted to start when the chamber is in use via an external trigger signal.

12. The method of claim 1 wherein vibration measurement data are displayed using an orbit plot.

13. The method of claim 1 wherein vibration measurement data are displayed using a time plot.

14. The method of claim 1 wherein said notification is an audible alarm.

15. The method of claim 1 wherein said notification is a visible alarm.

16. The method of claim 1 wherein said notification comprises a pre-alarm initiated at a lower alarm threshold.

17. The method of claim 16 wherein said pre-alarm is initiated at 70% of the alarm threshold.

18. A system to detect real-time wafer shift/slide in a semiconductor process chamber by measuring acceleration of the chamber representing vibration measurement, comprising:
   means to measure acceleration in three orthogonal directions, wherein said means to measure acceleration is mounted on a wall of said process chamber;
   a signal conditioner, amplifying the signals of the means to measure acceleration, wherein its output is the input of an anti-aliasing filter;
   an anti-aliasing filter attenuating high frequency signals from said signal conditioner, wherein its output is the input of an Analog-to-Digital converter;
   said analog-to-digital converter, wherein its output is the input of a dynamic spectrum analyzer
   said dynamic spectrum analyzer receiving measurement signals from said analog-to-digital converter comprising:
      said digital signal processor, performing all required calculations, receiving measurement signals from said analog-to-digital converter;
      a program and data memory, being connected to said digital signal processor;
      a digital-to-analog converter being connected to said digital signal processor;
      a watchdog device, being connected to said digital signal processor, monitoring an alarm function of the system;
      a relay being triggered by said digital signal processor; and
      a communication port being connected to said digital signal processor;
   a process controller, being connected to said digital signal processor
   an alarm device, being initiated by said relay;
   a visual display unit; and
   an unit providing keyboard inputs to said digital signal processor.

19. The system of claim 18 wherein said means to measure acceleration is mounted on an exterior wall of the chamber.

20. The system of claim 18 wherein said means to measure acceleration is mounted on an interior wall of the chamber.

21. The system of claim 18 wherein said means to measure acceleration is a tri-axial accelerometer.

22. The system of claim 18 wherein said means to measure acceleration are three uni-axial accelerometers.

23. The system of claim 18 wherein said means to measure acceleration is a combination of a dual-axial accelerometer with a uni-axial accelerometer.

24. The system of claim 18 wherein said means to measure acceleration are strain gauge devices.

25. The system of claim 18 wherein said means to measure acceleration are laser vibrometers.

26. The system of claim 18 wherein said anti-aliasing filter is a low-pass filter.

27. The system of claim 18 wherein a trigger signal provided as input of the digital signal processor is starting the vibration measurement.

28. The system of claim 18 wherein said communication port is a serial communication port.

29. The system of claim 28 wherein said serial communication port is a RS232 port.

30. The system of claim 18 wherein said alarm device provides a visual alarm.

31. The system of claim 18 wherein said alarm device provides an audible alarm.

32. The system of claim 18 wherein said visual display is capable to display an orbit plot.

33. The system of claim 18 wherein said visual display is capable to display a time plot.

34. The system of claim 18 wherein a personal computer is configured to perform the task of said dynamic spectrum analyzer.

35. The system of claim 18 wherein a personal computer is configured to perform the task of said process controller.

36. The system of claim 18 wherein said signal conditioner is built in said dynamic spectrum analyzer.

37. The system of claim 18 wherein the tasks of said digital signal processor include filtering, computation of time and frequency measurements, and management of multiple channel signal measurements.

38. The system of claim 18 wherein said digital signal processor computes time data from two channels and data for plots of relative forces.

39. The system of claim 18 wherein said watchdog is a comparator which compares the measured data to a pre-defined limit and triggers said digital signal processor to initiate an alarm if the measured data exceeds a predefined limit.

40. The system of claim 18 wherein said watchdog is used to reset the system in the event of a fault condition.

* * * * *